United States Patent
Ha

(10) Patent No.: US 6,845,080 B2
(45) Date of Patent: Jan. 18, 2005

(54) AUTOMATIC GAIN CONTROLLER FOR PREVENTING PEAKING IN OPTICAL DISC REPRODUCING SYSTEM AND METHOD THEREFOR

(75) Inventor: Jae-eun Ha, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 612 days.

(21) Appl. No.: 10/008,809

(22) Filed: Nov. 13, 2001

(65) Prior Publication Data

US 2002/0118623 A1 Aug. 29, 2002

(51) Int. Cl.$^7$ .................................................. G11B 7/00
(52) U.S. Cl. .............................. 369/124.11; 369/47.25
(58) Field of Search ........................ 369/124.1, 124.11, 369/124.12, 47.25, 47.27, 59.15, 53.15, 53.16, 53.35, 44.29, 44.35, 44.36, 47.14

(56) References Cited

U.S. PATENT DOCUMENTS

| | | | | |
|---|---|---|---|---|
| 5,631,891 A | * | 5/1997 | Moritsugu et al. | 369/124.11 |
| 6,205,095 B1 | * | 3/2001 | Hisakado et al. | 369/47.25 |
| 6,785,207 B2 | * | 8/2004 | Nishimura et al. | 369/124.11 |

* cited by examiner

Primary Examiner—Thang V. Tran
(74) Attorney, Agent, or Firm—Mills & Onello LLP

(57) ABSTRACT

An automatic gain controller (AGC) for preventing peaking in an optical disc reproducing system includes a capacitor for being charged to a voltage corresponding to a control current as a control voltage; an amplifier for inputting the optical disc reproducing signal as an input signal, amplifying the input signal by a gain corresponding to the control voltage, and generating the amplified input signal as the output signal; a peak detector for detecting a peak voltage in the output signal; a gm amplifier for converting a peak voltage detected by the peak detector into current and generating the converted current as the control current; and a peaking controller for preventing the capacitor from being charged by the control current in a defect section in the input signal, in response to a peaking control signal, and for maintaining a control voltage in the defect section to be the same as the prior to the defect section. The AGC is capable of maintaining the control voltage for controlling the AGC in the defect section to a control voltage of a normal state. Therefore, when a normal signal is input following the defect section signal, the AGC is capable of preventing the generation of peaking in the AGC output signal by the capacitor C1 maintaining its normal voltage.

7 Claims, 4 Drawing Sheets

AUTOMATIC GAIN CONTROLLER FOR PREVENTING PEAKING IN OPTICAL DISC REPRODUCING SYSTEM AND METHOD THEREFOR

BACKGROUND OF THE INVENTION

1. Field of the Invention

The present invention relates to an automatic gain controller (AGC) in an optical disc reproducing system, and more particularly, to an AGC for preventing peaking in an output signal of the AGC, and a method therefor, when a defect exists in a signal reproduced by an optical disc.

2. Description of the Related Art

An automatic gain controller (AGC) in an optical disc reproducing system such as a compact disc player (CDP) and a digital video disc player (DVDP) amplifies an optical disc reproducing signal reproduced from an optical disc to a signal having a uniform peak-to-peak voltage. The optical disc reproducing signal is input to the AGC after passing through a DC coupling capacitor.

When a defect exists in the optical disc reproducing signal, no signal is input to the AGC in the defect section due to the DC coupling capacitor. Therefore, the AGC amplifies the input signal by the maximum gain obtained by the AGC in the defect section. When a DC offset is present in the AGC, the AGC amplifies a DC voltage as well as an AC voltage. Therefore, the DC level of the signal output from the AGC changes in the defect section. When a normal input signal is input after the defect section, the DC offset level settles following a predetermined time period.

The voltage level of a control voltage for controlling the gain of the AGC, described below, becomes abnormal during the defect section. When a normal optical disc reproducing signal is input following the defect section, a peaking signal, in which the peak-to-peak voltage of an output signal is much larger than a desired voltage due to an abnormal control voltage, may exist. A section of the output signal corresponding to the DC level of the AGC becoming normal after the normal optical disc reproducing signal is input again is referred to as a peaking section. Data loss occurs during the peaking section.

FIG. 1 shows that a peaking signal is generated in an AGC output signal when a defect section exists in an optical disc reproducing signal. In FIG. 1, a first graph 2 shows the output of the AGC, a second graph 4 shows a control voltage for controlling the gain of the AGC, and a third graph 6 shows the DC level of the AGC.

Referring to FIG. 1, when a defect exists in the optical disc reproducing signal, a defect section T1, in which no signal is input to the AGC due to an external DC coupling capacitor, is generated. At this time, the gain of the AGC is maximized. In the defect section T1, not only the AC voltage of the AGC, but also the DC voltage of the AGC, is amplified. Referring to FIG. 1, the level of the control voltage 4 for controlling the gain of the AGC is more than 4V, which is abnormal, during the defect section T1.

Accordingly, when the normal optical disc reproducing signal is input again following the defect section, a section T2, in which the peak-to-peak voltage of the AGC output signal is much larger than a desired 1Vp-p voltage is generated, due to the abnormal control voltage. Data loss occurs in the section T2 in which the peaking signal exists

SUMMARY OF THE INVENTION

To address the above limitations, it is an object of the present invention to provide an automatic gain controller (AGC) for preventing peaking in an AGC output in signal due to a defect in an optical disc reproducing signal.

It is another object of the present invention to provide a peaking prevention method which is performed by the AGC for preventing peaking.

Accordingly, to achieve the first object, there is provided a peaking preventing automatic gain controller (AGC) for amplifying a signal reproduced from an optical disc to a signal having a peak-to-peak voltage of a uniform magnitude and generating the amplified signal as an output signal, in an optical disc reproducing system, the AGC comprising: a capacitor charged to a control voltage corresponding to a control current; an amplifier for inputting the optical disc reproducing signal as an input signal, amplifying the input signal by a gain corresponding to the control voltage, and generating the amplified input signal as the output signal; a peak detector for detecting a peak voltage in the output signal; a gm amplifier for converting a peak voltage detected by the peak detector into current and generating the converted current as the control current; and a peaking controller for preventing the capacitor from being charged by the control current during a defect section of the input signal, in response to a peaking control signal.

In a preferred embodiment, the peaking controller operation maintains the level of the control voltage in the defect section to be the same as that level it had before the defect section was encountered.

The peaking controller preferably comprises a switch turned on and off in response to the peaking control signal, the switch preventing the capacitor from being charged by the control current during the defect section.

To achieve the second object, there is provided a method for preventing peaking generated due to a defect in an optical disc reproducing signal in an AGC for amplifying a signal reproduced by an optical disc to a signal having a peak-to-peak voltage of a uniform magnitude and generating the amplified signal as an output signal, in an optical disc reproducing system, the method comprising: (a) determining whether a defect exists in the optical disc reproducing signal; (b) amplifying the optical disc reproducing signal to an output signal having a peak-to-peak voltage of a uniform magnitude corresponding to a control voltage when it is determined that a defect does not exist; (c) detecting peak voltage of the output signal; (d) converting the peak voltage into current and generating the converted current as control current; (e) charging a capacitor to a voltage corresponding to the control current and generating the charged voltage as the control voltage; and (f) maintaining the control voltage to be the same as that before a defect section when it is determined in the step (a) that a defect exists in the optical disc reproducing signal.

BRIEF DESCRIPTION OF THE DRAWING(S)

The above objects and advantages of the present invention will become more apparent by describing in detail a preferred embodiment thereof with reference to the attached drawings in which.

DETAILED DESCRIPTION OF PREFERRED EMBODIMENTS

An automatic gain controller (AGC) for preventing peaking according to the present invention in an optical disc reproducing system and a method therefor will now be described.

Figure 1:
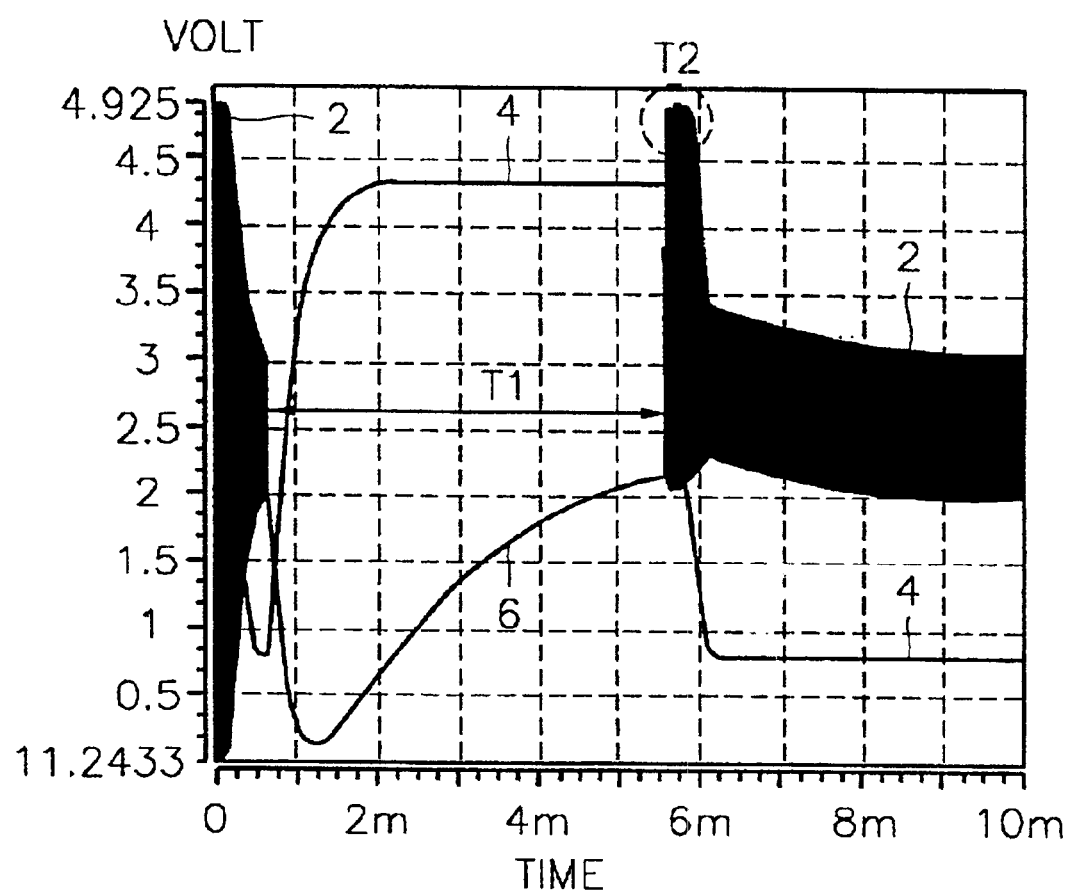
FIG. 1 shows the generation of a peaking signal in an automatic gain controller (AGC) output signal when a defect section exists in the optical disc reproducing signal.
Figure 2:
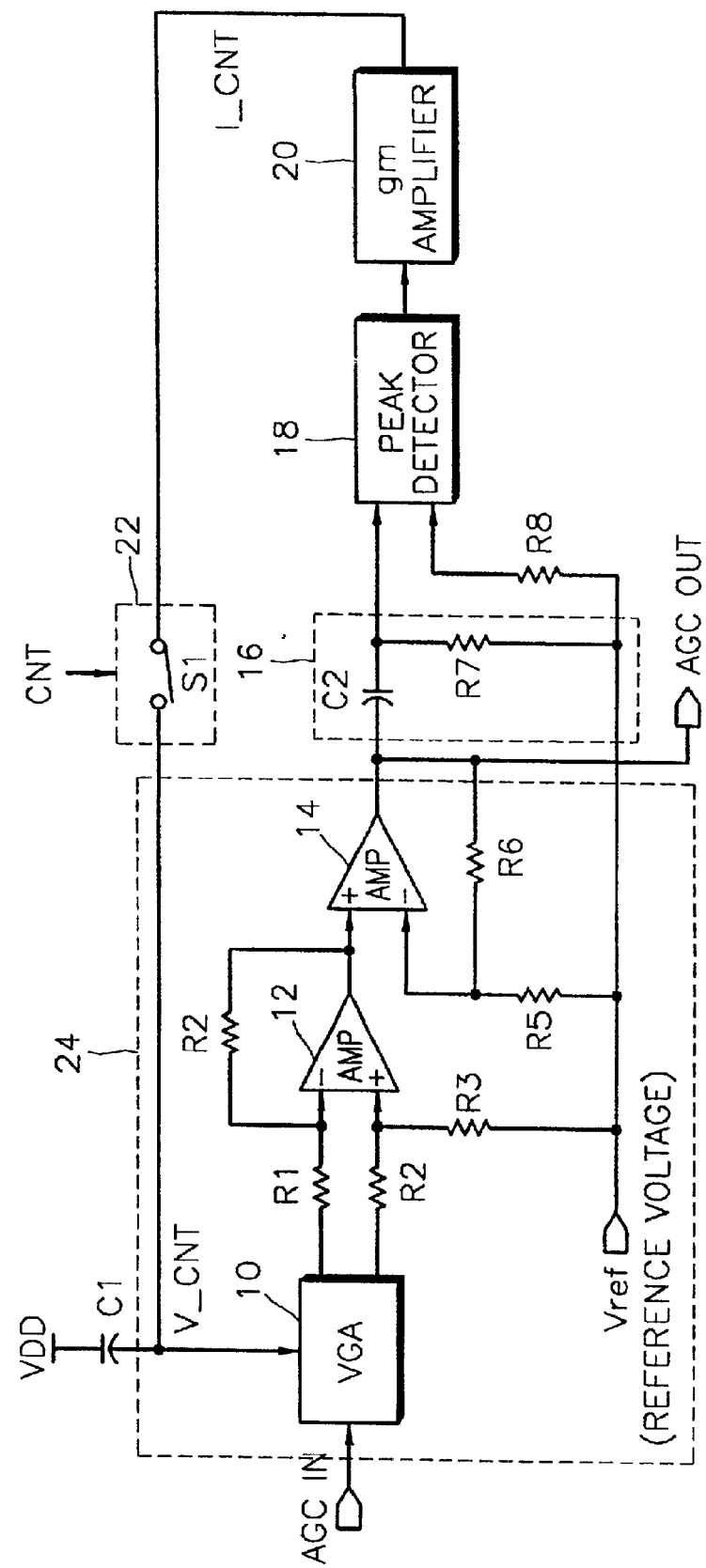
FIG. 2 is a schematic block diagram of an embodiment of an AGC for preventing peaking according to the present invention.

FIG. 2 is a schematic block diagram of an embodiment of an AGC for preventing peaking according to the present invention. The AGC for preventing peaking includes an amplifier 24, a high-pass filter 16, a peak detector 18, a gm amplifier 20, a capacitor C1, and a peaking controller 22.

The amplifier 24 amplifies an input signal AGC IN by a predetermined gain in response to a control voltage V_CNT and outputs the amplified signal from an output terminal AGC OUT. The input signal AGC IN is a signal obtained after an optical disc reproducing signal passes through a DC coupling capacitor. The control voltage V_CNT is voltage-charged to a capacitor C1. The amplifier 24 includes a voltage gain amplifier (VGA) 10 and amplifiers 12 and 14 as shown in FIG. 2. Namely, the VGA 10 amplifies the input signal AGC IN by a gain corresponding to the control voltage V_CNT. The amplifiers 12 and 14 amplify the signal amplified by the VGA 10 by a predetermined gain. Accordingly, a signal whose peak-to-peak voltage is about 1Vp-p is output as an output signal AGC_OUT.

In the input signal amplified by the amplifier 24, only the signal of a high frequency region of more than a predetermined frequency is transmitted to a peak detector 18 by a high-pass filter 16, which consists of a capacitor C2 and a resistor R7.

The peak detector 18 detects a peak voltage from the signal passed by the high-pass filter 16. The peak detector 18 is generally comprised of operational amplifiers (OP Amps).

The gm amplifier 20 generates current corresponding to the peak voltage detected by the peak detector 18 as control current I_CNT. The control current I_CNT output from the gm amplifier 20 is used as a feedback signal to charge the capacitor C1. The voltage charged to the capacitor CG by the control current I_CNT is used as the control voltage V_CNT for controlling the gain of the VGA 10 of the amplifier 24. The amplifier 24 generates a peak-to-peak voltage having a consistently uniform magnitude, for example, the output signal AGC_OUT of 1Vp-p, by the control voltage V_CNT charged to the capacitor C1.

The peaking controller 22 controls the charging of the capacitor C1 by the current output of the gm amplifier 20 in response to a peaking control signal CNT that is generated during a defect section in the optical disc reproducing signal. The peaking control signal CNT is provided from a predetermined circuit that detects defect sections in the optical disc reproducing signal, in an optical disc reproducing system. The peaking controller 22 can be simply realized as a switch S1 turned on and off in response to the peaking control signal CNT as shown in FIG. 2. Namely, in a signal section where a defect exists in the optical disc, the switch S1 is turned off in response to the peaking control signal CNT, thus preventing the DC coupling capacitor C1 from being charged by the current output from the gm amplifier 20. Accordingly, the control voltage V_CNT is maintained at the voltage prior to the defect section.

In a normal signal section, where there are no defects on the optical disc, the switch S1 is turned on in response to the peaking control signal CNT, thus allowing the DC coupling capacitor C1 to be charged normally in response to the control current I_CNT.

Figure 3:
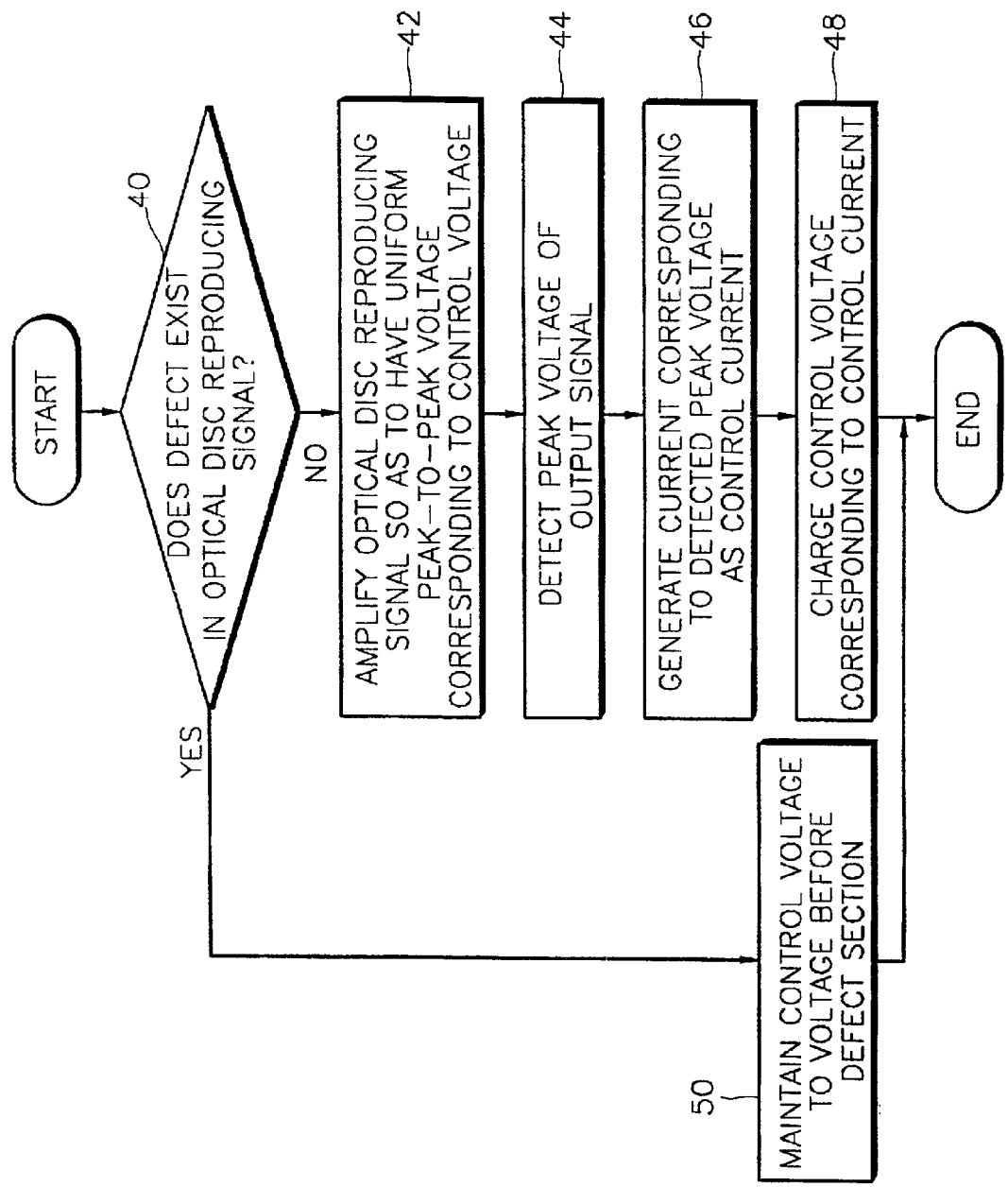
FIG. 3 is a flowchart of an embodiment of a peaking preventing method using the automatic gain controller for preventing peaking shown in FIG. 2.

FIG. 3 is a flowchart showing an embodiment of a peaking preventing method using the AGC for preventing peaking shown in FIG. 2.

The operation of the AGC for preventing peaking according to the present invention shown in FIG. 2 will be described with reference to FIGS. 2 and 3.

Referring to FIGS. 2 and 3, the operation of the AGC shown in FIG. 2 is controlled in response to the peaking control signal CNT, which determines whether a defect exists in the optical disc reproducing signal. When it is determined that there is no defect in the optical disc reproducing signal in response to the peaking control signal CNT (step 40), the switch S1 of the peaking controller 22 is turned on in response to the peaking control signal CNT. The amplifier 24 generates an output signal AGC OUT by having a uniform magnitude Vp-p, by amplifying the input signal AGC IN corresponding to the control voltage V_CNT charged to the capacitor C1 (step 42). The peak detector 18 detects the peak voltage of the output signal AGC OUT (step 44). The output signal AGC OUT input to the peak detector 18 may comprise, for example, a signal which passed through the high-pass filter 16.

Following step 44, the gm amplifier 20 generates the current corresponding to the peak voltage detected by the peak detector 18 as the control current I_CNT (step 46). The capacitor C1 is charged by the control current I_CNT generated in the step 46 (step 48). The voltage across the capacitor C1 controls the gain of the amplifier 24 as the control voltage V_CNT. Therefore, the amplifier 24 generates the output signal AGC OUT having a predetermined peak-to-peak voltage (for example, about 1Vp-p), by the control voltage V_CNT.

When it is determined that a defect exists in the optical disc reproducing signal in response to the peaking control signal CNT (step 40), the switch S1 of the peaking controller 22 is turned off in response to the peaking control signal CNT. Therefore, the control voltage V_CNT is not controlled by the gm amplifier 20 and is maintained at its previous level, prior to encountering the defect (step 50).

When a defect exists in the optical disc reproducing signal, it is possible to prevent the control voltage V_CNT across the capacitor C1 from abnormally increasing by temporarily disconnecting the capacitor C1 and the gm amplifier 20 with the switch S1. It is possible to minimize peaking in the output signal AGC OUT, when the normal input signal AGC IN is input, by maintaining the control voltage V_CNT at its level prior to encountering a defect.

Figure 4:
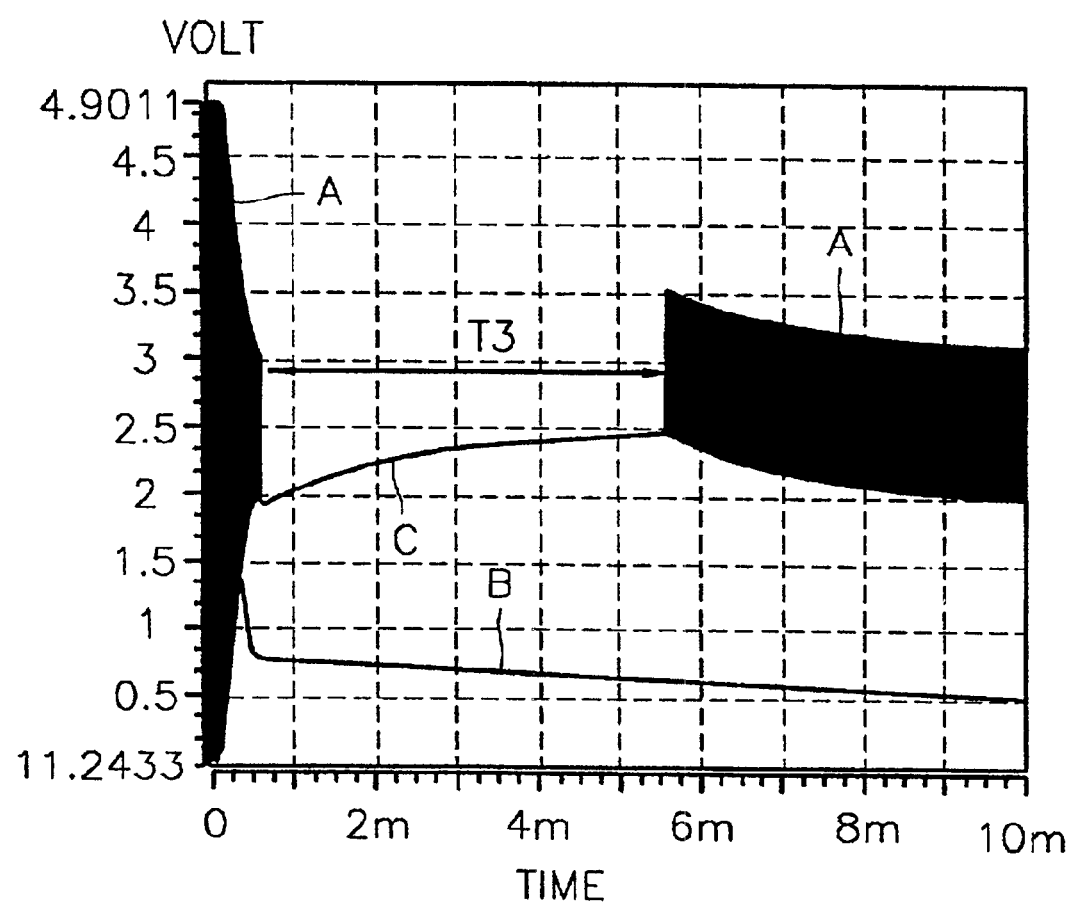
FIG. 4 is a waveform diagram showing the operation states of the AGC for preventing peaking shown in FIG. 2.

FIG. 4 shows waveforms showing the operation states of the AGC for preventing peaking shown in FIG. 2. In FIG. 4, a first graph A shows the output of the AGC. A second graph B shows a control voltage for controlling the gain of the AGC. A third graph C shows the DC level of the AGC.

Referring to FIGS. 2 and 4, the switch S1 of the peaking controller 22 is turned off in response to the peaking control signal CNT generated during a defect section T3 in which a defect exists in the optical disc reproducing signal. The capacitor C1 is not charged by the control current I_CNT output by the gm amplifier 20 during the defect section T3. Therefore, the voltage across the DC coupling capacitor C1 is maintained at its level in a normal operation state in the section in which the defect exists. Namely, as shown in the second graph B, no difference in the control voltage V_CNT in the defect section T3 and a section in which the normal input signal AGC IN is input. The magnitude of the charge voltage of the capacitor C1 is uniform. Therefore, it is possible to remove the peaking phenomenon from the output signal AGC OUT due to the abnormal charge of a voltage to the capacitor C1 that otherwise would have occurred during the defect section T1 in conventional technology.

In the drawings and specification, there have been disclosed typical preferred embodiments of the invention and, although specific terms are employed, they are used in a generic and descriptive sense only and are not for purposes of limitation, the scope of the invention being set forth in the following claims. Therefore, it will be understood by those skilled in the art that various changes in form and details may be made therein without departing from the spirit and scope of the invention as defined by the appended claims.

As mentioned above, according to the AGC for preventing peaking in an optical reproducing system and the method therefor according to the present invention, it is possible to maintain the control voltage for controlling the AGC in the defect section, at the control voltage in a normal state. Therefore, when a normal signal is next input, following the defect section, it is possible to prevent the generation of peaking in the AGC output signal by the capacitor C1 maintaining its normal voltage.

What is claimed is:

1. A peaking preventing automatic gain controller (AGC) for amplifying a signal reproduced from an optical disc to a signal having a peak-to-peak voltage of a uniform magnitude and for generating the amplified signal as an output signal, in an optical disc reproducing system, the AGC comprising:

a capacitor charged to a control voltage corresponding to a control current;

an amplifier for inputting the optical disc reproducing signal as an input signal, amplifying the input signal by a gain corresponding to the control voltage, and generating the amplified input signal as the output signal;

a peak detector for detecting a peak voltage in the output signal;

a gm amplifier for converting the peak voltage detected by the peak detector into current and generating the converted current as the control current; and a peaking controller for preventing the capacitor from being charged by the control current in a defect section in the input signal, in response to a peaking control signal.

2. The peaking preventing AGC of claim 1 wherein the peaking controller prevents charging of the capacitor for maintaining the control voltage in the defect section to be the same as the control voltage prior to the defect section.

3. The peaking preventing AGC of claim 1, further comprising a high-pass filter for transmitting only a component higher than a predetermined frequency in the output signal output to the peak detector.

4. The peaking preventing AGC of claim 1, wherein the peaking controller comprises a switch turned on and off in response to the peaking control signal, the switch for preventing the capacitor from being charged by the control current during the defect section.

5. A method for preventing peaking generated due to a defect in an optical disc reproducing signal in an AGC for amplifying a signal reproduced by an optical disc to a signal having a peak-to-peak voltage of a uniform magnitude and generating the amplified signal as an output signal, in an optical disc reproducing system, the method comprising:

(a) determining whether a defect exists in the optical disc reproducing signal;

(b) amplifying the optical disc reproducing signal to an output signal having a peak-to-peak voltage of a uniform magnitude corresponding to a control voltage when it is determined that a defect does not exist;

(c) detecting a peak voltage of the output signal;

(d) converting the peak voltage into current and generating the converted current as control current;

(e) charging a capacitor to a voltage corresponding to the control current and generating the charged voltage as the control voltage; and (f) maintaining the control voltage at a level prior to a defect section when it is determined in the step (a) that a defect exists in the optical disc reproducing signal.

6. The method of claim 5, wherein step (b) further comprises transmitting only frequencies higher than a predetermined frequency in the output signal.

7. The method of claim 5, further comprising activating and deactivating a switch in response to the determination of the existence of a defect in step (a), for preventing further charging of the capacitor by the control current when a defect exists.

* * * * *

UNITED STATES PATENT AND TRADEMARK OFFICE
CERTIFICATE OF CORRECTION

PATENT NO. : 6,845,080 B2
DATED : January 18, 2005
INVENTOR(S) : Jae-eun Ha

It is certified that error appears in the above-identified patent and that said Letters Patent is hereby corrected as shown below:

Title page,
Item [56], References Cited, U.S. PATENT DOCUMENTS, please add the following references:

| | | | |
|---|---|---|---|
| -- 4,682,314 | 7/1987 | Nakagaki, *et al.* | 369/44 |
| 5,355,356 | 10/1994 | Johann, *et al.* | 369/59 |
| 5,606,544 | 2/1997 | Katsuhara | 369/124 |
| 5,699,343 | 12/1997 | Moritsugu, *et al.* | 369/124 |
| 5,825,239 | 10/1998 | Adal | 327/563 |
| 6,137,647 | 10/2000 | Voorman, *et al.* | 360/67 --. |

Signed and Sealed this

Twenty-seventh Day of September, 2005

JON W. DUDAS
*Director of the United States Patent and Trademark Office*